(12) United States Patent
Vierheilig et al.

(10) Patent No.: US 8,056,428 B2
(45) Date of Patent: Nov. 15, 2011

(54) LUBRICATING ELEMENT AND LUBRICATING UNIT

(75) Inventors: Gerald Vierheilig, Wuerzburg (DE); Matthias Zeier, Obereichtersbach (DE); Juergen Mueller, Burkardroth (DE)

(73) Assignee: Robert Bosch GmbH, Stuttgart (DE)

( * ) Notice: Subject to any disclaimer, the term of this patent is extended or adjusted under 35 U.S.C. 154(b) by 654 days.

(21) Appl. No.: 12/173,219

(22) Filed: Jul. 15, 2008

(65) Prior Publication Data

US 2009/0022437 A1 Jan. 22, 2009

(30) Foreign Application Priority Data

Jul. 20, 2007 (DE) .................... 10 2007 034 452

(51) Int. Cl.
*F16H 29/20* (2006.01)
*F16H 57/04* (2010.01)
*F16C 21/00* (2006.01)
*F16C 33/10* (2006.01)
*F16N 7/12* (2006.01)
*F16J 15/26* (2006.01)

(52) U.S. Cl. ............ 74/89.44; 74/467; 184/5; 184/102; 277/512; 384/13

(58) Field of Classification Search ............... 74/89.23, 74/89.34, 89.4, 89.44, 424.7, 424.71, 424.81, 74/424.82, 467; 184/102, 5; 384/13; 277/512, 277/549

See application file for complete search history.

(56) References Cited

U.S. PATENT DOCUMENTS

| | | | |
|---|---|---|---|
| 5,207,204 A | 5/1993 | Kawachi et al. | |
| 5,492,413 A | 2/1996 | Tsukada | |
| 6,568,508 B2 * | 5/2003 | West et al. .................... | 184/5 |
| 7,587,955 B2 * | 9/2009 | Vierheilig et al. ............ | 74/89.44 |
| 7,748,284 B2 * | 7/2010 | Vierheilig et al. ............ | 74/89.44 |
| 2001/0010176 A1 * | 8/2001 | Tsukada et al. .............. | 74/89.44 |
| 2001/0037695 A1 * | 11/2001 | Tsukada et al. .............. | 74/89.44 |
| 2011/0113905 A1 * | 5/2011 | Dietz et al. .................. | 74/89.44 |

FOREIGN PATENT DOCUMENTS

| | | |
|---|---|---|
| EP | 0 874 172 | 10/1998 |
| JP | 5-71443 | 3/1993 |

* cited by examiner

*Primary Examiner* — Thomas R Hannon
*Assistant Examiner* — Adam D Rogers
(74) *Attorney, Agent, or Firm* — Michael J. Striker (57) ABSTRACT

The present invention relates to a lubricating element (12) for rolling element tracks, in particular linear systems, with a body composed of a lubricant-storing material, which includes an application section (34) capable of being brought in contact with a rolling element bearing surface to supply lubricant, and which includes a storage region (22) for lubricant that abuts the application section (34), the body being provided with at least one recess (38) in the storage region (22), on an end opposite to the application section (34).

22 Claims, 5 Drawing Sheets

LUBRICATING ELEMENT AND LUBRICATING UNIT

CROSS-REFERENCE TO A RELATED APPLICATION

The invention described and claimed hereinbelow is also described in German Patent Application DE 10 2007 034 452.1 filed on Jul. 20, 2007. This German Patent Application, subject matter of which is incorporated herein by reference, provides the basis for a claim of priority of invention under 35 U.S.S. 119(a)-(d).

BACKGROUND OF THE INVENTION

The present invention relates to a lubricating element for rolling element tracks, in particular linear systems, with a body made of a lubricant-storing material, which includes an application section capable of being brought in contact with a rolling element bearing surface to supply lubricant.

Linear systems in the sense of the present application are rolling element screw drives (e.g., ball spindle drives), rolling element ring bushings (e.g., ball ring bushings), and rolling element-supported profiled rail guides, which are often also referred to as linear guides. An aspect shared by all of these linear systems is that a nut element or carriage element is supported such that it is movable along a linear guide element, and a longitudinal displacement of the nut element or carriage element takes place by rolling elements (balls or rollers) rolling between tracks formed on the nut element or carriage element and the guide element. The rolling bodies move along a closed path in a rolling element circuit with a load channel formed between facing bearing surfaces on the linear guide element and on the nut element or carriage element, and a return channel that connects the two ends of the load channel and is typically guided by the nut element or carriage element.

To ensure that the rolling of the rolling elements is satisfactory, the tracks of linear systems of this type must be lubricated with a lubricant (typically a lubricating oil), mainly in the region of the load channel. To enable compensation for lubricant losses that unavoidably occur during operation of a system of this type, it is desired that lubricant be supplied continually during the entire operating period, the lubricant supply ideally remaining consistent for the entire duration of operation and being chosen such that its level exactly compensates for the lubricant losses.

Publication U.S. Pat. No. 5,492,413 discloses a sealing plate for a carriage of a profiled rail guide that is supported such that it is movable along a guide rail. The sealing plate is mounted on both axial ends of the carriage and is bonded with a layer made of a lubricant-saturated, foamed material, which performs the lubricating function. The inner edge of this foamed material layer forms a lubricant delivery lip resting on the guide rail, which is supplied with lubricant from the surrounding regions of the foamed material layer.

Publication EP 0 874 172 B1 also discloses a sealing plate for a profiled rail guide with an integrated lubricating device, which is installed on the axial ends of a carriage. With this multi-component lubricating device, an element, e.g., a perforated plate, which limits the flow path of the lubricant from the first layer to the second layer, is located between a first, lubricant-storing layer, which is not in contact with the guide rail, and a second, lubricant-supplying layer, the inner edge of which bears against the guide rail. As a result, the rate at which lubricant is supplied is limited in such a manner that it remains as stable as possible, independently of the stored quantity of lubricant, which decreases the longer the linear guide operates.

A further system—designed as a single piece—for lubricating rolling element tracks of a profiled rail guide is made known in JP 5-71443 U. With this system, lubricant-saturated foamed material inserts are inserted in a receiving space of a sealing unit installed on the axial ends of the carriage. The insides of the foamed material inserts are in contact with the rolling element bearing surfaces of the guide rail.

SUMMARY OF THE INVENTION

The object of the present invention is to provide a lubricating element for rolling element tracks, which is as easy to install as possible and which makes it possible to adjust the lubricant supply rate in a satisfactory manner, even over longer operating periods.

This object is attained according to the present invention in that, in the case of a lubricating element for rolling element tracks, in particular linear systems, with a body composed of a lubricant-storing material, which includes an application section capable of being brought in contact with a rolling element bearing surface to supply lubricant, and which includes a storage region for lubricant that abuts the application section, the body is provided with at least one recess in the storage region, on an end opposite to the application section.

The recess is enclosed by edges made of the lubricant-storing material of which the body is composed. These edges are preferably permeable to lubricant and located such that, when the lubricating element is installed in an associated lubricating element receptacle of a lubricating unit, it plunges at least partially into a lubricant sump containing fluid lubricant. For example, the lubricant may be gradually replenished from a lubricant reservoir of any size in the storage region of the body via the edges that enclose the recess. At the same time, by restoring a suitable fill level in the lubricant sump, it may be ensured that the edges of the recess plunge—at least in sub-sections—into the liquid lubricant, thereby ensuring that lubricant is replenished in the storage region, beyond the duration of a long service life and the resultant reduction in the lubricant level.

A particular advantage of the present invention is that, due to the recess, an adequate volume is provided to ensure that penetrated lubricant is absorbed when the lubricating element is inserted into a related receptacle of the lubricating unit.

When a lubricating element is inserted into an associated receptacle of a lubricating unit that contains a quantity of lubricant that is suitable for operating the lubricating unit, the pores in the body of the lubricating element are unable to immediately absorb a sufficient quantity of lubricant to somewhat compensate for the volume of the sections of the lubricating element that are immersed in the lubricant. Lubricant is therefore displaced and the level of the liquid lubricant in the lubricant sump increases quickly, until, after a certain amount of time, a sufficiently large quantity of lubricant has reached the storage region. The result of this effect is that lubricant spills out of the receptacle when the lubricating element is inserted, or, in order to avoid this, only a small quantity of lubricant may be added in the first place, to avoid overflow. In both cases, the level of lubricant in the receptacle is too low at the end of the filling procedure to ensure that lubricant may be replenished during the desired operating period. It is therefore necessary to replenish lubricant.

According to the present invention, the recess ensures that an adequate volume exists to accept the displaced lubricant, yet the edges—which are made of a lubricant-storing material and which surround the recess—still plunge far enough into the lubricant that is located in the lubricant sump to ensure that the lubricant in the storage region of the body of the lubricating element is replenished from the lubricant sump beyond the duration of the service life.

Preferably, a large number of recesses is provided, which are located one after the other on one end of the storage region. The recesses are separated by a projecting section of the body, which is composed of a lubricant-storing material. The recesses are located next to each other such that an essentially comb-like structure of the body results on one end of the storage region, the projecting sections of the lubricant-storing material forming the teeth of the comb, between which the recesses are located.

In the installed state of the lubricating element, the sections of the body—which is composed of a lubricant-storing material—that project outwardly and form the teeth of the comb preferably plunge equidistantly into the lubricant sump. Liquid lubricant is therefore contained in the recesses, and it is gradually absorbed by the body via the projecting sections of lubricant-storing material, and it is stored in the storage region. When the lubricating element is inserted into the lubricating element receptacle, the projecting sections initially displace the lubricant contained in the receptacle. The level of lubricant therefore increases in the recesses, which are formed between the projecting sections. The recesses therefore become filled with lubricant. The lubricant is then gradually absorbed by the lubricant-storing material (which is barely wetted with lubricant at this point) of the projecting sections, and it is distributed in the storage region and in the application section. This process ends when equilibrium is attained between the flow of lubricant from the lubricant sump into the recesses in the storage region, and a lubricant flow from the storage region in the lubricant sump into the recesses. When the storage region empties as the service life continues, liquid lubricant is replenished from the recesses into the projecting sections and, from there, it is distributed in the storage region.

Due to the volume provided in the recesses, when the lubricating element is inserted into the lubricating element receptacle, lubricant contained in the recess is prevented from overflowing, because it can not be absorbed quickly enough by the lubricant-storing material.

A "lubricant-storing material" is understood to mean a material that may be saturated with a lubricant (i.e., a liquid with suitable viscosity) and that is capable of storing a certain quantity of this lubricant. When the term "effective porosity" is used to describe the portion of the volume formed by cavities or pores in a material of a specified total volume of the material, this means that a lubricant-storing material has an effective porosity greater than zero. The effective porosity may be a constant, but it is often the case that the effective porosity depends on the quantity of a stored lubricant, because the pores may expand as the quantity of stored lubricant increases.

In the state in which the lubricating element is installed in the linear system for operation, an application section—located on the body—of the lubricating element bears against a rolling body bearing surface, so that, when there is relative motion between the nut element or carriage element and the guide element, the application section glides along the rolling element bearing surface and supplies a certain quantity of lubricant to the rolling element bearing surface while this gliding motion takes place. When the lubricating element is assigned, e.g., to the carriage element or the nut element, the application section glides along the rolling element bearing surface formed on the guide element. The quantity of lubricant dispensed is replenished from the storage region adjacent to the application section. During operation, this results in a lubricant flow through the storage region toward the application section. This lubricant flow is essentially driven by a concentration gradient of stored lubricant that arises from the application section through the first storage region. In addition, depending on the installation position, further effects may also play a role, e.g., shear force effects when the device is installed in a nearly vertical position.

The body may be formed, e.g., of an open-cell foamed material. Ester-based PUR foamed materials have proven to be a suitable foamed material, for example. Foamed materials of this type may be foamed and then pressed to form panels having a desired pore size. Panels have proven suitable, e.g., with a relative density after pressing of between 60 and 250 kg/m$^3$, particularly approximately 200 kg/m$^3$. Foamed materials of this type are available under the trade names Inducon, Normont, and Cellofoam. In the past, it has been shown that these foamed materials are suitable in terms of their wear resistance and chemical resistance, and in terms of their lubricant absorption capacity.

The body may be cut out of a foamed material panel, e.g., using water-jet cutting, and is relatively easy to manufacture in this manner.

It is not required to use a separate application section. Instead, the application section may be formed as a single piece with the first storage region, which is favorable in terms of manufacturing. For example, the body may include at least one indentation in the first storage region. The application section is formed between the indentation and one or more lateral surfaces of the body, or the body may include several indentations in the first storage region. The application section is formed between the indentations and, possibly, lateral surfaces of the body. Roughly speaking, it could be said that a cut-out end of the first storage region forms the application section. The size, i.e., the cross section in particular, of the application section may thereby be adapted to the particular rolling element bearing surface.

In addition, the region between the indentation and the lateral surface, or the region between indentations, which is provided to form the application section, is capable of being folded over, thereby forming a right angle with the adjacent surface of the body. The application section is then positioned transversely to the longitudinal direction of the first storage region, at least in the installed state of the lubricating element. The angle between the direction of extension of the application section and the longitudinal direction of the first storage region is preferably essentially 90°. This method of creating the application section requires that the material of which the body is composed have a certain formability and/or elasticity. Since this material must still have porosity, so it is capable of storing lubricant (a foamed material is typically used), it may be assumed that practically any feasible material will allow the region provided for the application section to be folded over. To name an example of this design of the application section, the body may include—on an end face in the first storage region—at least one slot, which extends essentially in the longitudinal direction of the first storage region, and one of the two subregions produced as a result may be folded over on the end face, so that this subregion projects laterally, and its longitudinal direction extends at a right angle, e.g., essentially orthogonally, to the longitudinal direction of the upper storage region.

The cross section of the application section may be smaller than the cross section of the body in the first storage region. The cross section of the application section is understood to mean essentially the cross section of the application section that is in contact with the bearing surfaces of the rolling elements. This cross section is typically chosen depending on the dimensions of the particular bearing surface, i.e., ultimately the dimensions of the rolling elements, such that the application section may bear essentially entirely against the bearing surface. In practical applications, embodiments have proven effective with which the cross section of the applicator is only half as large or one-fourth as large as the cross section of the body in the first storage region.

The cross section of the applicator has negligible influence on the rate of lubricant supply, since the length of the applicator is negligibly small compared with the length in the longitudinal direction of the first storage region. As a result, a concentration gradient that is sufficiently great is always formed across the application section.

To accommodate a first storage region with a long length in the longitudinal direction in the most compact space possible, it may be provided that the body is essentially annular in shape, at least in the storage region. This system is particularly favorable when the linear system includes a cylindrical guide element, e.g., a spindle of a rolling element screw drive or a cylinder guide of a ring bushing. In the case of a rolling element screw drive, the annular storage region, for example, may be guided around the guide element. An application section, which is bent at a right angle relative to the circumferential direction of the ring, is in contact with the outer surface of the guide element in which the rolling element tracks are formed.

The application section may be located—relative to the ring axis defined by the storage region—on the longitudinal end of the storage region. The opposite longitudinal end of the storage region may then be provided with the at least one recess.

The body is preferably formed—at least in the storage region—of an essentially rectangular base element, which is wound in an annular shape. The resultant ring may be a completely closed ring, or it may form a sub-section of a ring in the circumferential direction. It is also feasible for the base element to be wound with overlapping sections, i.e., forming a multiple ring, at least in sub-sections. When the expression "annular shape" is used below, it does not necessary refer to an exactly circular cross-section. Instead, the ring may have any other closed shape.

The annular shape may be such that, e.g., in the wound state of the body, a gap remains between two end faces of the rectangular main body, which are opposite to each other and extend essentially in the direction of the ring axis. In this case, it makes sense to form the application section on one of the end faces, which are opposite to each other in the wound state.

When the storage region is partially immersed in a lubricant sump when in the installed state, the advantages are as follows:

When a linear motion system is operated, lubricant is transported primarily from the storage region toward the application section. As a result, the storage region becomes increasingly depleted of lubricant as operation continues. After a sufficiently long period of operation, this would result in the storage region becoming fully depleted of lubricant. In this situation, the lubricating element would have to be replaced or resaturated with lubricant. When the storage region of the body is connected with a lubricant sump, however, the lubricant sump forms a further storage area, the lubricant storage volume of which is preferably much greater. In this case, shutdown periods, during which the linear system is shut down for shorter or longer periods of time, may be used to automatically refill the lubricant supply stored in the storage region of the lubricating element. Since the quantity of lubricant stored in the storage region typically drops considerably after a certain operating period, when the carriage or the nut element of the linear system comes to a standstill, a lubricant flow sets in—provided that the lubricant sump contains an adequate quantity of lubricant—from the lubricant sump into the storage region of the lubricating element, via which the storage region is refilled.

When the linear system, is started up once more, the rate of lubricant supply via the application section is therefore clearly higher than it was at the end of the most recent shutdown period. In fact, it approaches the new state when the shutdown period is sufficiently long. Even very brief shutdown periods may be utilized in this manner as standstill phases of the carriage and the nut element.

The storage region therefore performs the function of an intermediate storage element, which is refilled during shutdown periods with lubricant supplied from the lubricant sump. As a result, the rate of lubricant supply may always be held between a predetermined maximum value when the storage region is completely full and a minimum value—which is close to the predetermined maximum value—when the storage region has been nearly entirely depleted of lubricant, and this for the entire service life of a linear system. In this manner, lifetime lubrication of linear systems may be realized in a very simple manner.

It has proven favorable when approximately one-third of the volume of the quantity of lubricant to be added is displaced when the lubricating element is inserted. The volume of the recess—or all recesses together, when several recesses are involved—should therefore amount to approximately one-third of the volume of the lubricant to be added, thereby ensuring that the quantity of lubricant that was displaced may be absorbed. A value for the width of the recess and/or any particular recess, when several recesses are involved, that has proven to be favorable is approximately 1.5-times the thickness of the body in the storage region. The depth of the recess is particularly significant. It indicates the extent to which the edges of the sections that form the recesses extend away from the base of the recess, in particular relative to the height of the lubricating element, i.e., essentially the distance from the projecting ends of the edges of the recess to the end of the body and/or storage region located opposite to the recesses. It has been shown that the depth of the recess—or any particular recess, when several recesses are involved—should be nearly half the height of the storage region.

Preferably, it is provided that the inventive lubricating element is integrated in a lubricating unit for tracks of rolling elements of a linear system, in particular in a rolling element screw drive or a ball screw drive, of a profiled rail guide or a ring bushing. The linear system includes a nut element or carriage element that is movably guided via rolling elements along a linear guide element. The lubricating unit is installed on an axial end of the nut element or carriage element. With a nut element or carriage element provided with a lubricating unit on both axial ends, lubrication of the rolling element tracks may take place even in the load channel in any direction of motion before the rolling elements guided in their endless circuit come in contact with the bearing surface. This results in extremely efficient lubrication that requires a very small amount of lubricant.

The lubricating unit preferably includes a lubricating element housing, in which a receiving space for the lubricating element is formed; the maximum volume of the receiving space corresponds to the sum of the volume of the lubricating element and the volume of the lubricant to be added.

The inventive lubricating element is suited most particularly for use in cases in which the linear system is a rolling element screw drive, particularly a ball screw drive, including a spindle as the guide element, and a nut element enclosing the spindle, as the movable element; at least one nut groove with two end regions—the nut groove extending around the axis in the manner of a helix and guiding rolling elements—is formed in the inner circumferential surface of the nut element, the nut groove defining—together with the outer circumferential surface of the spindle—a helical rolling element screw path extending between the two end regions; the rolling element screw path is appended by a rolling element return path extending between the two end regions to form a closed rolling element recirculating path, which is filled with an endless row of rolling elements—ready to roll at all times—lying in the nut groove and on a helical trajectory of the outer circumferential surface; a rolling element deflection for transferring the rolling elements between the rolling element screw path and the rolling element return path or between the rolling element return path and the rolling element screw path is located on the nut element in each of the end regions.

With the lubricating unit, an annular receiving space for the lubricating element may be formed, e.g., in a cylindrical lubricating element housing, in fact, such that an inner wall of the lubricating element housing encloses the linear guide element, e.g., the spindle of a rolling body screw drive or the cylinder guide of a ring bushing. An opening may be formed in the inner wall of the receiving wall, through which the application section of the lubricating element is guided in order to contact the rolling body bearing surface. With a rolling element screw drive, e.g., the application section guided through the opening comes in contact with a spiral running groove for the rolling elements formed in the outer surface of the spindle.

An application nose with inwardly projecting segments, in which the opening for the application section may be formed, may be located in the inner wall of the lubricating element housing. The segments serve to better fix the application section in position. In particular, they are located such that the lubricant-storing material of which the application section is made is pressed together easily when the application section is guided through the opening. Since the lubricant-storing material has a certain elasticity due to its pore structure, the application section is held in place against displacement forces that acts in its longitudinal direction. This hold may also serve, e.g., to compress the application section in its longitudinal direction between the application nose and the rolling body circuit, thereby resulting in a particularly good bearing contact with the rolling body circuit to be lubricated.

To attain the greatest flexibility possible with a rolling element screw drive in particular, it is feasible to insert the application nose into the inner wall of the lubricating element housing, in which the opening for the carrier section is formed, e.g. to design it to be insertable into the inner wall, e.g., in the axial direction. By providing various possibilities for the position of the opening for various application noses, the same lubricating element housing may be used for different thread pitches on the spindle. When holes with different-sized cross sections are also provided in the application nose, the same lubricating unit—its housing, in particular—may also be used for several ball diameters.

In terms of manufacturing, it is simpler, however, when the application nose with the segments is designed integral with the inner wall.

It is also possible to provide a stop in the receiving area for the lubricating element, against which an end face of the lubricating element bears, in the installed state. It may therefore be easily ensured that the lubricating element assumes its intended installation position and that the application section is in the correct position.

BRIEF DESCRIPTION OF THE DRAWINGS

The present invention will be described in greater detail below based on exemplary embodiments, with reference to the attached drawings.

DESCRIPTION OF THE PREFERRED EMBODIMENTS

Figure 1:
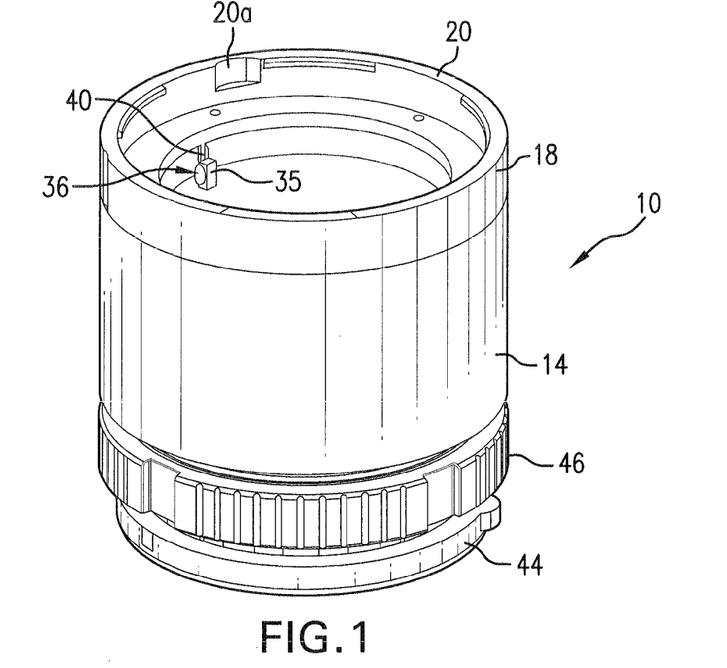
FIG. 1 shows a perspective view of a lubricating unit with an embodiment of an inventive lubricating element, which is designed to be installed on the axial end of a nut element of a rolling element screw drive.
Figure 2:
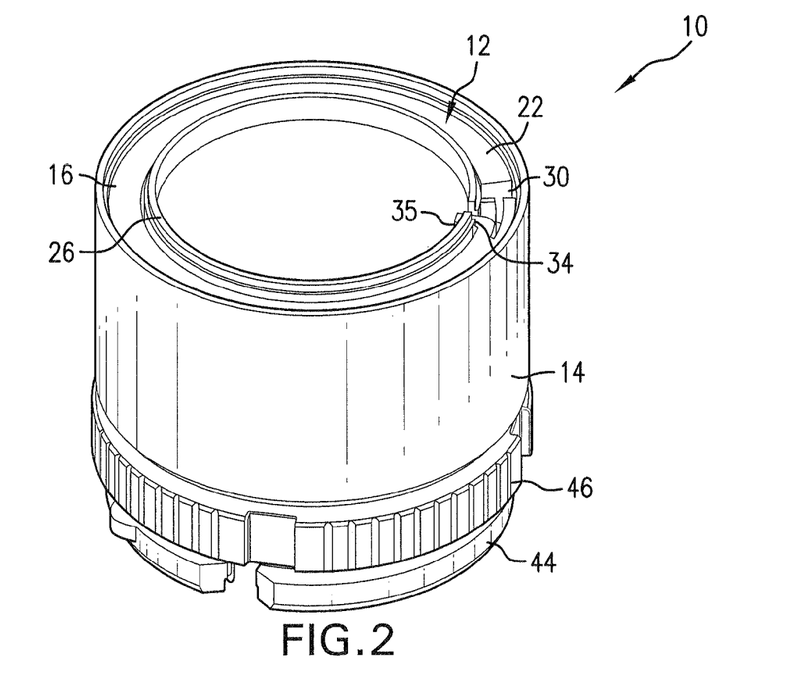
FIG. 2 shows the lubricating unit in FIG. 1, with the cover removed.

FIG. 1 shows a perspective view of a lubricating unit—labeled in general with numeral 10—to be installed on the axial end of a nut element of a rolling element screw drive. FIG. 2 shows the same lubricating unit 10 as in FIG. 1, but with cover 18 removed. An inventive lubricating element 12 is shown in FIG. 2 in particular, which is inserted in a circular receiving space 16 of a lubricating element housing 14. Receiving space 16 is bounded by the outer wall of lubricating element housing 14 and an inner wall 26 concentric therewith.

Figure 3:
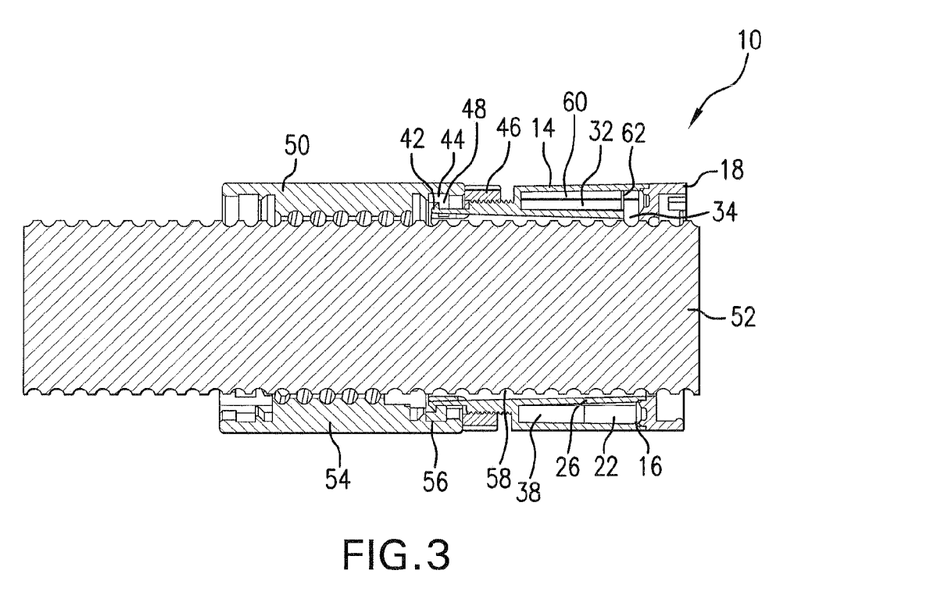
FIG. 3 shows a cross-sectional view through the lubricating unit shown in FIGS. 1 and 2 in a state in which it is installed on the axial end of a nut element of a ball screw drive.
Figure 4:
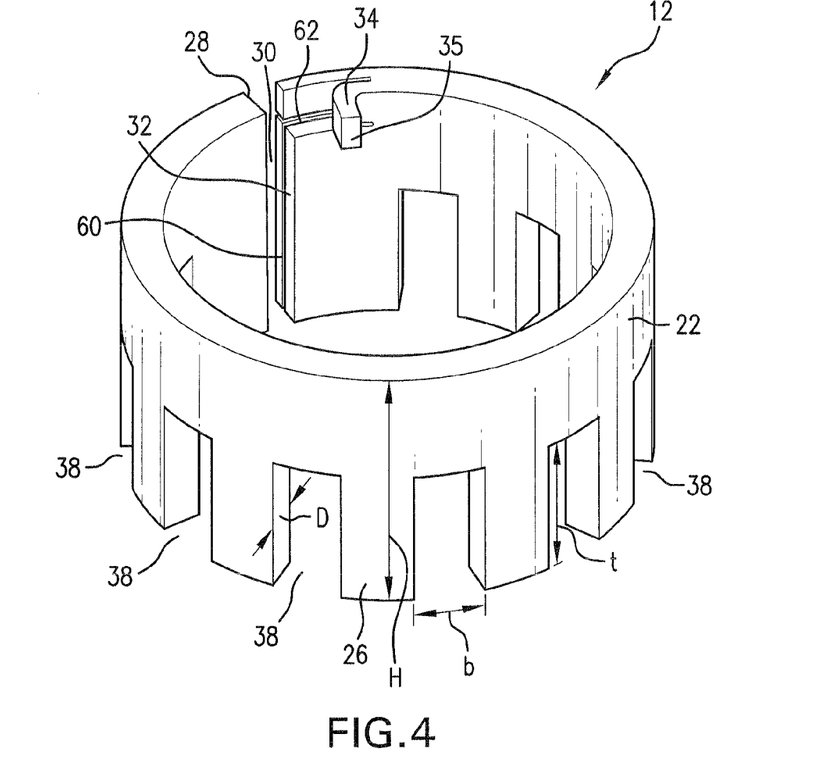
FIG. 4 shows the embodiment—depicted in FIG. 1—of an inventive lubricating element with an annularly bent storage region, in a perspective view.

Lubricating element 12 shown in FIG. 2, and which is shown in greater detail in FIGS. 3 and 4, includes a body made of a material with the highest possible effective porosity (e.g., foamed material), so that a lubricant, e.g., oil, may be stored in its pores. In the installed state in an annular storage region 22 as shown in FIG. 3, the body is designed essentially annular in shape overall. The annular contour of the body in storage region 22 is not completely closed. Instead, it includes an essentially axially-extending gap 30 bounded by two opposite end faces 28, 32 of the body.

An application section 34, which extends toward the inside of annular receiving space 16, is formed on an end face 32 of the body. Application section 34 is cut as a single piece out of the material of the body forming annular storage region 22, and it is folded over toward the ring axis. In the state of being installed for operation, free end 35 of application section 34 bears against the rolling element track designed in the shape of a spiral in the outer surface of the spindle. Lubricating element 12 is then saturated with lubricant, which is gradually dispensed onto the rolling element track via application section 34. Application section 34 is shown particularly clearly in FIG. 4, and it will be explained in greater detail with reference to FIGS. 4 and 5.

Lubricating unit 10 includes an application nose 36, which is designed integral with inner wall 26 of receiving area 16 for lubricating element 12. An opening 40 is formed in application nose 36, through which—when lubricating element 12 is installed—application section 34 projecting inwardly from first storage region 22 is guided, so that its free end 35 bears against the rolling element track. Application nose 36 is shown in detail in FIGS. 6 through 9, and it will be described in greater detail with reference to these figures.

Various lubricating elements 12 may be inserted in receiving space 16 of lubricating element housing 14, provided they have an essentially annular shape with an outer diameter and inner diameter in the region between the outer surface and inner surface of annular receiving area 16. Receiving area 16 is typically with a quantity of lubricant, e.g., oil, which is required for operation before it is inserted into lubricating element inserts 12. Lubricating element 12, which is not yet wetted with lubricant, is then immersed in the lubricant contained in receiving area 16. When the body of lubricating element 12 is installed, it gradually becomes saturated with lubricant.

After lubricating element 12 is installed on lubricating element housing 14, cover 18, which closes receiving area 16, is put in place, A seal is located in cover 18, which bears against the upper surface of the spindle of the rolling element screw drive and ensures that no foreign subjects enter the intermediate space between the nut element and the spindle surface. The seal therefore serves to optimally seal the rolling element running channel formed between the nut element and the spindle. Projecting edge 20 formed on the front side of cover 18 includes several recesses 20*a*, into which an assigned projection of the seal (not shown in FIG. 1) may engage. This allows the seal to be fixed in place relative to the cover and prevented from rotating in the circumferential direction.

The cross-sectional view in FIG. 3 shows how lubricating unit 10 is installed on nut body 54 of a ball screw drive composed of a nut 50 and a spindle 52.

Figure 6:
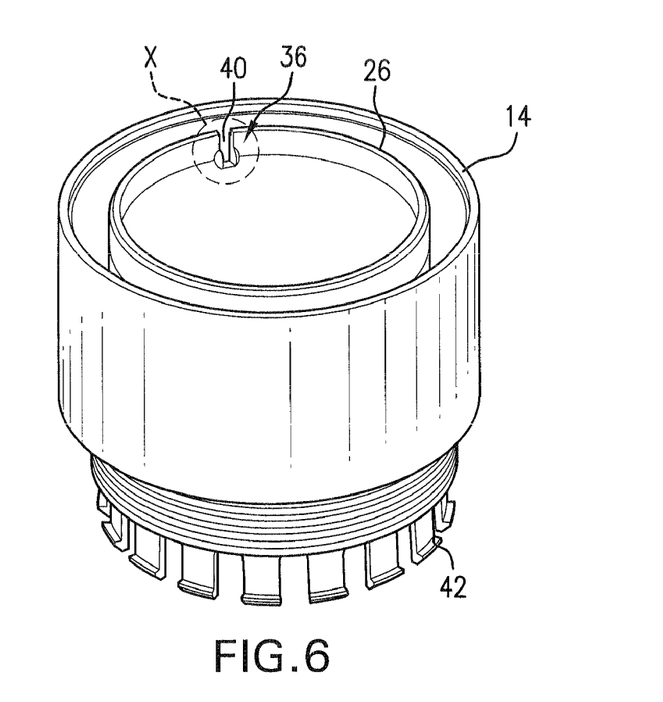
FIG. 6 shows the lubricating element housing of the lubricating unit shown in FIGS. 1 and 2, without the lubricating element.

On its front end, which bears against nut element 50 of the rolling element screw drive, lubricant housing 14 includes latch hooks 42 that extend in the axial direction and are distributed concentrically around its inner surface (see also FIG. 6). In the embodiment shown, lubricating unit 10 is mounted on nut element 50 of the rolling element screw drive using latch hooks 42, a clamping ring 44 designed as a segmented split washer, and a lock nut 46. To this end, latch hooks 42 are brought in engagement with a circumferential groove 56 formed in the inner surface of nut element 50 of the rolling element screw drive. Circumferential groove 56 normally serves to accommodate the seal of nut element 50, to protect the nut against penetration by foreign substances from the outside, the seal now being located in cover 18 when lubricating unit 10 is installed. To ensure better retention of lubricating unit 10 in circumferential groove 56, latch hooks 42 do not engage in circumferential groove 56 directly, but rather via auxiliary clamping ring 44. Clamping ring 44 includes a projection 48 extending in the circumferential direction on its inner circumferential edge, which extends much further inward than the very shallow depth of annular groove 56. This makes it possible to use larger latch hooks 42, with resultant greater stability. Lock nut 46 serves to ultimately fix lubricating unit 10 in position axially on nut element 50. Lock nut 46 engages in a thread cut into the outer circumference of lubricating element housing 14 of lubricating unit 10 and, after latch hooks 42 engage with projection 48, lock nut 46 is tightened and brought to bear against a front side of nut element 50.

Auxiliary clamping ring 44 is inserted in circumferential groove 56 formed in the inner surface of nut body 54 and bears tightly against its base under the effect of its preload. Latch hooks 42 also bear against projection 48 of clamping ring 44—which projects radially inwardly and extends in the circumferential direction—and secures lubricating unit 10 from moving in the axial direction away from nut main body 54. The distance between the inner—in the radial direction—surface of latch hooks 42 and the outer—in the radial direction—surface of spindle 52 is chosen to be so small that the latch hooks cannot become disengaged from projecting section 48 of clamping ring 44 when spindle 52 is inserted. The nut unit composed of nut element 50 and lubricating unit 10 must therefore be removed from spindle 52 before lubricating unit 10 may be removed. Since latch hooks 42—when engaged with clamping ring 44—also have a certain amount of preload in the radially outward direction, an external force that presses latch hooks 42 inward is required to disengage clamping rings 42 from clamping ring 44. Lubricating unit 10 is ultimately fixed in position on nut main body 54 in the axial direction by tightening lock nut 46 relative to nut main body 54.

In FIG. 3 it is shown that application section 34 extending inwardly in the radial direction away from the storage region 22 engages in rolling element running groove 58 formed in a spiral shape in the outer surface of spindle 52, so that its free end is in contact with the base of rolling element running groove 58. Application section 34 is retained laterally by application nose 36 (see FIGS. 6 through 9), and it is secured against displacement in its longitudinal direction. The length of application section 34 between its free end 35, which bears against the rolling element bearing surface, and the section in contact with application nose 36 is somewhat larger than the distance between application nose 36 and the base of rolling element running groove 58. Application section 34 is therefore somewhat compressed in this installation state. The elasticity of application section 34, which is made of a foamed material, ensures that, during operation of the ball screw drive, free end 35 of application section 34 remains in contact with the rolling body bearing surface and may provide it with lubricant.

Figure 5:
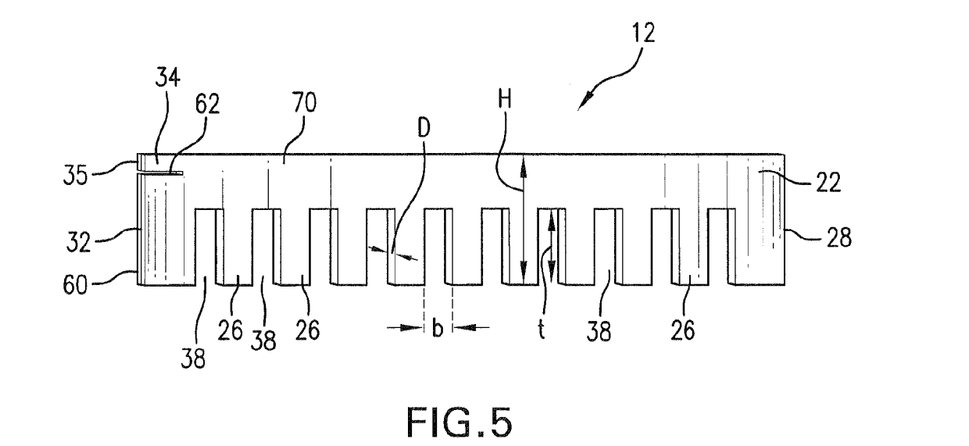
FIG. 5 shows a cut-out, foamed material panel, which is used to form the lubricating element shown in FIG. 4.

FIG. 4 shows lubricating element 12—which is shown in the installed state in FIG. 2—alone and in an enlarged view. FIG. 5 shows, in addition thereto, lubricating element 12 in a state in which it has not yet been wound into an annular shape.

In addition to the explanations provided with reference to FIGS. 2 and 3, FIG. 4 clearly shows the one-pieced design of lubricating element 12 with circularly-bent storage region 22 and application section 34 cut out of it. Storage region 22 is not closed in the circumferential direction to form a complete ring. Instead, it includes a gap 30 that extends in the axial direction, which is formed between two end faces 28, 32 of storage section 22. Application section 34, which extends radially inwardly, is formed on storage region 22, on the one end (shown in FIGS. 4 and 5 at the top) of annular storage region 22 relative to the ring axis and, in fact, by applying two orthogonal indentations 60, 62 in an end face 28, 32, which limits gap 30, and by bending a section of the lubricating element body formed in this manner, the lubricating element body being located on the inside of the ring and being adjacent to its upper end shown in FIG. 4.

Lubricating element 12 is made of a foamed material panel 70 (see FIG. 5). Foamed material panel 70 is original cut out as a rectangular cuboid, with a rectangular base surface that forms a flat side, which is bounded by two opposite longitudinal sides and two opposite narrow sides, which are much shorter than the longitudinal sides. In end face 32 assigned to one of the narrow sides, which is positioned at a right angle to the flat side, first indentation 60 is designed to extent parallel to the flat side between the two longitudinal sides of the panel. Second indentation 62 extends orthogonally to the flat side of rectangular foamed material panel 70 and orthogonally to the first indentation, and it extends through the thickness of foamed material panel 70 between its two flat sides. By way of these two indentations 60, 62, a total of four separate regions with a nearly rectangular cross section on end face 32 is formed, one of which is eventually folded inwardly, forming application section 34 (see FIG. 4).

A large number of recesses 38 is formed on the other end—relative to the ring axis—of annular storage region 22 (shown in FIGS. 4 and 5 at the bottom). Recesses 38 are separated by a projection section 26, which projects out of the lubricant-storing material of lubricating element body. For clarity, only a few of these recesses and projections are labeled with reference numerals in FIGS. 4 and 5. Recesses 38, which are cut out of rectangular base plate 70 along their one longitudinal side, have the same depth t and width b, and they are located next to each other along this longitudinal side, and/or next to each other in the circumferential direction along the other longitudinal end of the lubricating element body, which is annular in shape in the installed state. Projection sections 26, which belong to storage region 22, also have the same width, thereby resulting in a comb-like or zig-zag structure on the other end of storage region 22, with projection sections 26 projecting out of the lubricant-storing material which, in the installed state, plunge into the liquid lubricant contained in lubricating element receiving area 16.

Depth t of recesses 38 is nearly more than half of total height H between the two—relative to the ring axis—opposite ends of storage region 22. The projecting sections may therefore plunge sufficiently far into the liquid lubricant in lubricating element receiving area 16, and sufficient volume remains in storage region 22 to ensure that the lubricant will be evenly distributed between projecting sections 26 and application section 34. To ensure that sufficient volume remains for displaced lubricant, it has proven advantageous when the total volume provided by recesses 38 amounts to approximately one-third of the volume of lubricant required for lubrication.

Width b of recesses 38 as measured between two edges located opposite to each other in the circumferential direction of annular storage region 22 is approximately 1.5 times the thickness D of the lubricant-storing material.

An open-cell foamed material is used to manufacture lubricating element 12. To create the open-cell foamed material, a plastic is foamed and pressed to form panels with the desired relative density, e.g., approximately 200 kg/m³. The foamed material inserts which form lubricating element 12 are cut from these panels using water-jet cutting.

The inserts are saturated with a lubricant, e.g., a lubricating oil, by inserting them into receiving space 16 of lubricating unit 10. Instead of a purely open-cell foamed material, a foamed material may be used, e.g., with which the open-cell foamed material is closed-cell in design on the top and bottom flat sides. This has the advantage that the lubricant cannot leak out of the closed-cell edge regions, thereby ensuring that the lubricant may essentially only flow parallel to the flat sides.

Plastic foamed materials manufactured via foaming, gelation and subsequent vulcanization of the foam are top selections as the material for lubricating element 12. The thickness of the foamed material panels manufactured using this method may be between 1.0 and 15.0 mm. Ester-based polyurethane foams have proven to be suitable, for example. They are available under the trade names Inducon, Normont and Cellofoam, for instance.

Suitable lubricants have been found to be lubricating oils with a viscosity between 70 and 90 mm²/sec. at 100° C., and 900 to 1000 mm²/sec. at 40° C., e.g., the lubricating oil sold under the trade name Mobil SH-C600 series 639, which has a viscosity of 79.5 mm²/sec. at 100° C., and 933 mm²/see. at 40° C.

Figure 7:
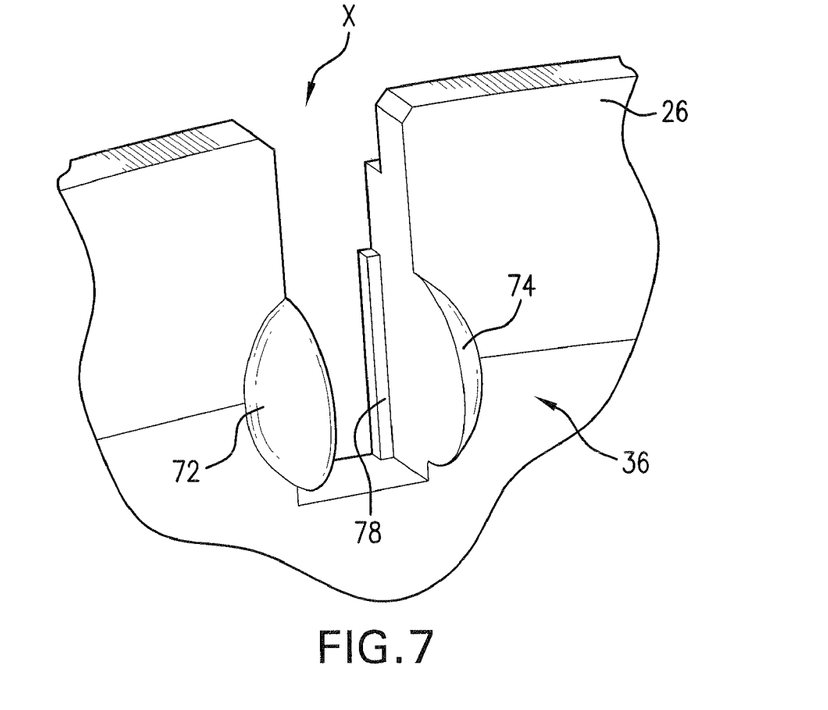
FIG. 7 is an enlarged view of a detained section of FIG. 6, which shows the application nose.

FIG. 6 shows the lubricating element housing of lubricating unit 10 shown in FIGS. 1 and 2, without lubricating element 12 inside. FIG. 7 shows an enlarged view of a detail X, indicated as a dashed line in FIG. 6, and representing application nose 36. As shown in FIG. 7 in particular, application nose 36 includes two segments 72, 74, which are formed integral with inner wall 16 of lubricating element receptacle 16, which are located opposite to each other at the sides of opening 40 and extend inwardly, orthogonally with inner wall 16.

These segments serve to fix application section 35 in place after it has been guided through opening 40. This is shown particularly clearly in the top view in FIG. 8 along the annular axis toward the lubricating element housing in depicted in FIG. 6, with the lubricating element inserted, and in FIG. 9, which shows a detail labeled Y in FIG. 8. Segments 72 and 74 are separated by a distance that is slightly less than the cross section of application section 34. Application section 34 is therefore narrowed by segments 72, 74 when it is inserted in opening 40. Due to the elasticity of the lubricant-storing material of which application section 34 is made, this results in a certain amount of clamping force, which, in particular, counteracts an extension of the application section in its longitudinal direction. In this manner, the application section may even be somewhat preloaded relative to the rolling element circuit, so that it comes to bear securely against the rolling element circuit. It is also feasible to located additional strips 78 in opening 40, instead of reducing the distance between segments 72, 74.

Figure 8:
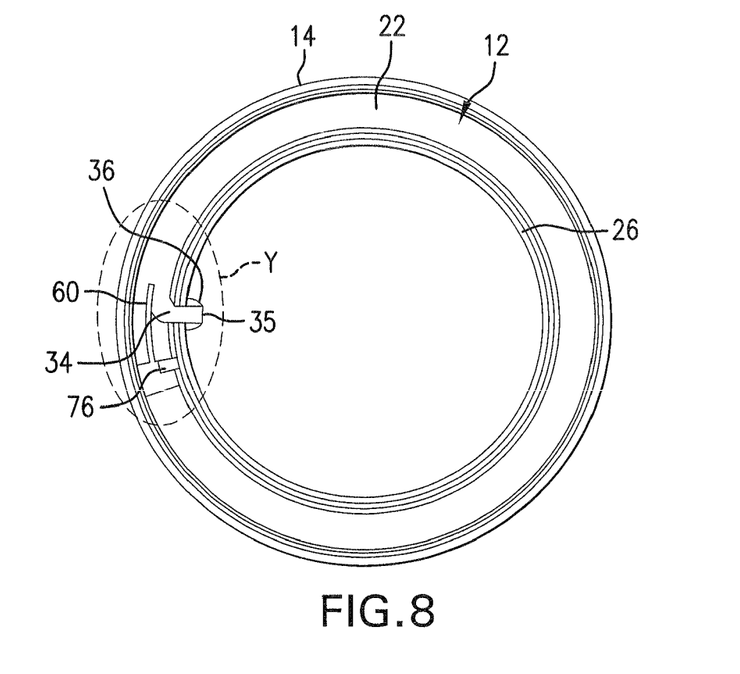
FIG. 8 shows a top view along the ring axis of the lubricating element housing in FIG. 6, with a lubricating element inserted.
Figure 9:
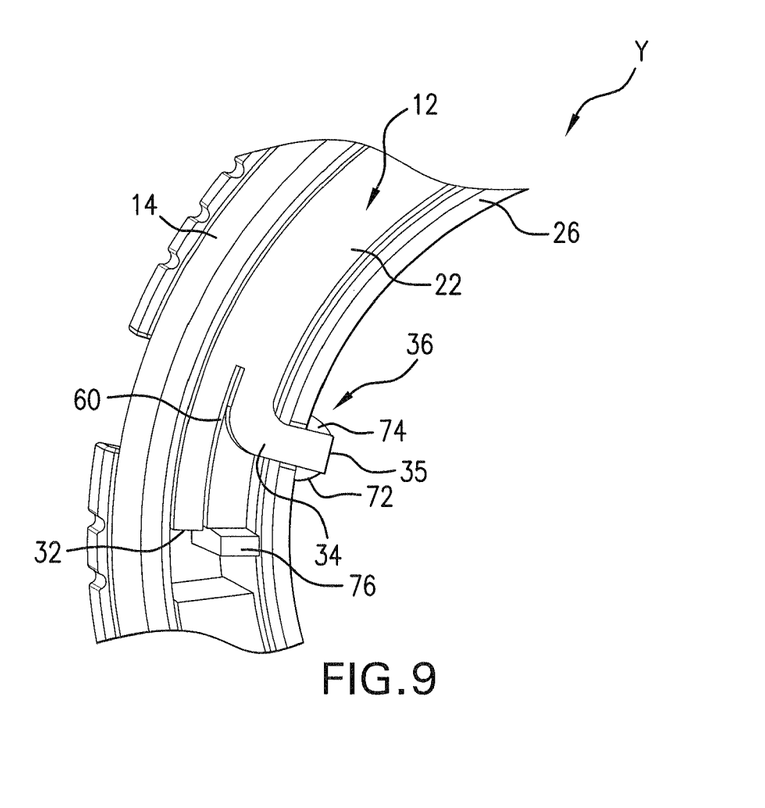
FIG. 9 is an enlarged view of a detailed section of FIG. 8, which shows the application section.

Reference numeral 76 in FIGS. 8 and 9 labels a stop against which, in the installed state, lubricating element 12 bears with its end face 32, on which application section 34 is also formed. Stop is formed by an element that has been inserted in lubricating element receptacle 76, or which is formed integrally with a wall that bounds lubricating element receptacle 16. The stop ensures that the lubricating element is positioned exactly when it is installed, in particular with regard for the position of application section 34 relative to application nose 36.

It should also be noted that the body may be composed of felt.

The invention claimed is:

1. A lubricating unit (10) for tracks of rolling bodies of a rolling element screw drive with a nut element guided along a linear guide element (52) by rolling bodies including a lubricating element (12), the lubricating unit is installed on an axial end of the nut element (50);

the lubricating unit (10) is characterized by a cylindrical lubricating element housing (14), in which an annular receiving space (16) for the lubricating element (12) is formed; an inner wall (26) of the cylindrical lubricating element housing (14) encloses the linear guide element (52), wherein the linear guide element is a spindle of the rolling element screw drive; and the lubricating element (12) includes a body composed of a lubricant-storing material, which includes an application section (34) capable of being brought in contact with the rolling element bearing surface (58) to supply lubricant, and which includes a storage region (22) for lubricant that abuts the application section (34), wherein the body is provided with at least one recess (38) in the storage region (22), an opening (40) is formed in the inner wall of the cylindrical lubricating element housing (14), through which an application section (34) of the cylindrical lubricating element (12) is guided in order to contact a rolling element bearing surface (58).

2. The lubricating unit (10) as recited in claim 1, wherein the at least one recess (38) is at least partially filled with lubricant.

3. The lubricating unit (10) as recited in claim 1, wherein the at least one recess comprises a plurality of recesses (38), the recesses are located one after the other on one end of the storage region (22), being separated by a projecting section (26) of the body.

4. The lubricating unit (10) as recited in claim 1, wherein the body is composed of an open-cell foamed material.

5. The lubricating unit (10) as recited in claim 1, wherein the body is cut out of a foamed material panel (70).

6. The lubricating unit (10) as recited in claim 1, wherein the application section (34) is designed as one piece with the storage region (22).

7. The lubricating unit (10) as recited in claim 6, wherein the body includes at least one indentation (60, 62) in the storage region (22), the application section (34) being formed between the at least one indentation (60) and lateral surfaces of the body.

8. The lubricating unit (10) as recited in claim 7, wherein the storage region between the at least one indentation (60, 62) and the lateral surfaces, which is provided to form the application section (34), is capable of being folded over, thereby forming a right angle with an adjacent surface of the body.

9. The lubricating unit (10) as recited in claim 1, wherein the cross section of the application section (34) is smaller than the cross section of the body in the storage region (22).

10. The lubricating unit (10) as recited in claim 9, wherein the body is formed, at least in the storage region (22), of an essentially rectangular basic element (70) that is wound in an annular shape.

11. The lubricating unit (10) as recited in claim 10, wherein in a wound state of the body, a gap (30) remains between two end faces (28, 32) of the essentially rectangular basic element (70), which are opposite to each other and extend essentially in the direction of an annular ring axis.

12. The lubricating unit (10) as recited in claim 10, wherein the application section (34) is formed on one end face (28; 32), wherein end faces are located opposite to each other in a wound state.

13. The lubricating unit (10) as recited in claim 1, wherein the body is designed essentially annular in shape, at least in the storage region (22).

14. The lubricating unit (10) as recited in claim 13, wherein the application section (34) is located, relative to an annular ring axis defined by the storage region (22), on a longitudinal end of the storage region (22), and the at least one recess (38) is provided on an opposite longitudinal end of the storage region (22).

15. The lubricating unit (10) as recited in claim 1, wherein a volume of the at least one recess (38) amounts to nearly one-third of a volume of a lubricant to be added.

16. The lubricating unit (10) as recited in claim 1, wherein the width (b) of the at least one recess (38) is approximately 1.5-times the thickness (D) of the body in the storage region (22).

17. The lubricating unit (10) as recited in claim 1, wherein the depth (t) of the at least one recess (38) amounts to nearly one-half of the height (H) of the lubricating element (12).

18. The lubricating unit (10) as recited in claim 1, wherein an application nose (36) is located in the inner wall (26) of the cylindrical lubricating element housing (14), the opening (40) for the application section (34) is formed in the application nose, and wherein the application nose includes inwardly extending segments (72, 74).

19. The lubricating unit (10) as recited in claim 18, wherein the application nose (36) is integrally formed in the inner wall (26).

20. The lubricating unit (10) as recited in claim 1, wherein a stop (76) is provided in the annular receiving space (16) for the lubricating element (12), against which an end face (32) of the lubricating element (12) bears, in an installed state.

21. The lubricating unit (10) as recited in claim 1, wherein the at least one recess (38) in the storage region (22) is provided on an end opposite to the application section (34).

22. The lubricating unit (10) as recited in claim 1, wherein the at least one recess (38) in the storage region (22) is provided on the same end as the application section (34).

* * * * *